United States Patent [19]

Mann

[11] 4,411,080
[45] Oct. 25, 1983

[54] HIGH-LEAD YARDER RAKE

[76] Inventor: Donald B. Mann, 8811 131st Ave. Northeast, Lake Stevens, Wash. 98258

[21] Appl. No.: 295,077

[22] Filed: Aug. 21, 1981

[51] Int. Cl.³ .............................. E02F 3/60; E02F 3/48
[52] U.S. Cl. ....................................... 37/117; 37/2 R; 172/707; 414/722
[58] Field of Search ................ 37/2 R, 115, 117, 120, 37/121, 195, 116, 118 R, 118 A, 117.5, DIG. 3, DIG. 12; 56/395–398; 172/697, 694, 691, 707, 26.5, 26.6, 711; 414/722

[56] References Cited

U.S. PATENT DOCUMENTS

| | | | |
|---|---|---|---|
| 277,455 | 5/1883 | Burket | 37/120 X |
| 572,935 | 12/1896 | Topping | 172/691 X |
| 809,593 | 1/1906 | Wible | 37/120 |
| 1,074,538 | 9/1913 | Alexander | 172/26.6 X |
| 1,234,734 | 7/1917 | Crowe | 37/117 X |
| 1,332,609 | 3/1920 | Crawford | 37/117 X |
| 1,457,594 | 6/1923 | Neary | 37/117 |
| 1,691,513 | 11/1928 | Burkett | 37/115 X |
| 1,760,840 | 5/1930 | Enard | 37/115 X |
| 1,764,518 | 6/1930 | Marks | 37/117 |
| 2,371,549 | 3/1945 | Sembler et al. | 37/2 R |
| 2,625,870 | 1/1953 | Peacock et al. | 37/2 R X |
| 2,846,789 | 8/1958 | Addicks | 37/115 X |
| 2,857,690 | 10/1958 | Yake et al. | 37/120 |
| 2,860,426 | 11/1958 | Allin, Jr. et al. | 37/2 R |
| 3,135,061 | 6/1964 | Perry et al. | 37/120 X |
| 3,274,710 | 9/1966 | Wright | 37/2 R |
| 3,445,945 | 5/1969 | Howell | 37/120 X |
| 3,845,870 | 11/1974 | Balderson et al. | 37/118 A |
| 4,241,525 | 12/1980 | Mann | 37/DIG. 3 |

FOREIGN PATENT DOCUMENTS

| | | | |
|---|---|---|---|
| 204601 | 3/1956 | Australia | 37/DIG. 3 |
| 206382 | 5/1956 | Australia | 37/2 R |

*Primary Examiner*—Clifford D. Crowder
*Attorney, Agent, or Firm*—Seed and Berry

[57] ABSTRACT

A high-lead yarder rake is capable of clearing brush, timber, and other debris at a logging site when hauled just above the surface along a main line with a main line yarder. The rake has a generally rectangular frame having a top, a bottom, two sides, a vertical, central cross-member extending between the top and bottom, and a horizontal tine support extending between the sides. A plurality of tines are mounted on the tine support to extend downwardly to rest against the frame's bottom and to project downwardly from the bottom as teeth. Additional support members may be used to strengthen the tine support. A riser extension may be added above the top to further increase the volume which the rake may hold. A method for using the rake to clear a site is also disclosed.

18 Claims, 4 Drawing Figures

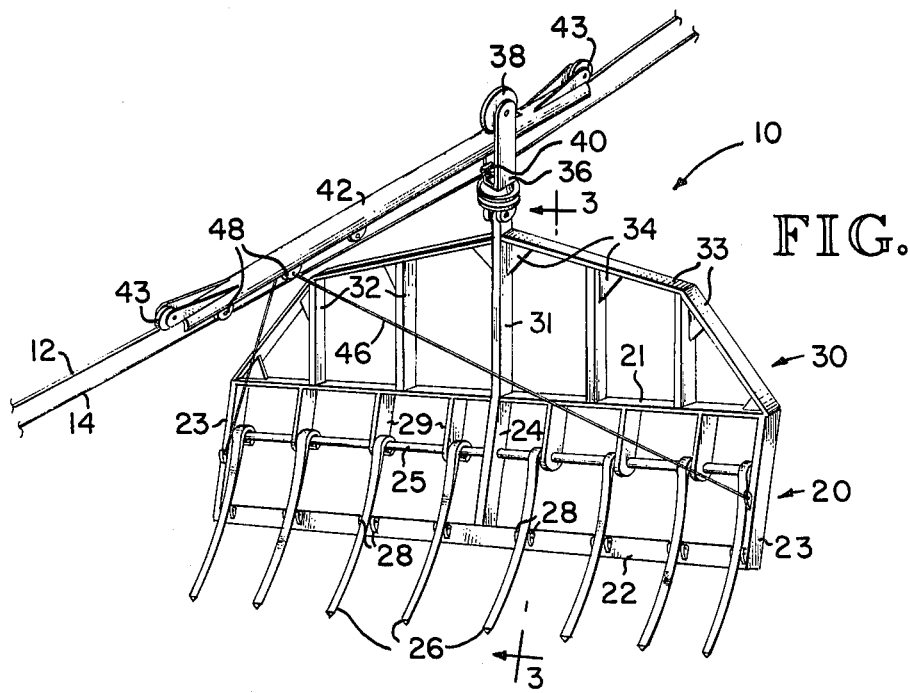
FIG. 2
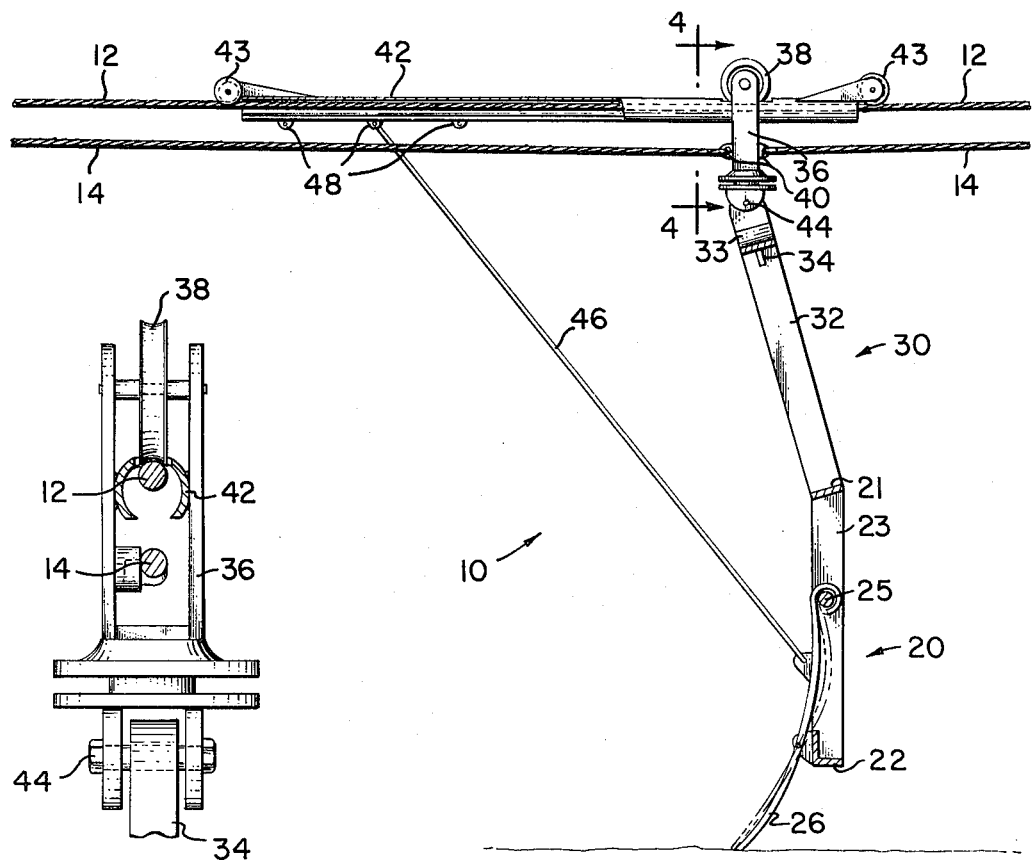
FIG. 4
FIG. 3

HIGH-LEAD YARDER RAKE

DESCRIPTION

TECHNICAL FIELD

This invention relates to the art of rakes, and more particularly, to a high-lead yarder rake capable of clearing brush, timber, and other debris at a logging site when hauled just above the surface with the main line of a yarder.

BACKGROUND ART

Clearing brush, timber, and other debris from a logging site has been a demanding and expensive task. Bulldozers and other tracked vehicles operated by a crew of up to ten men were brought to the site to plow the debris. Often it was difficult for the vehicles to reach the site. More often, the contour of the site (valleys or sloping ground) made it difficult for the vehicles to operate. Costs could be reduced with a method for clearing the debris which did not depend upon time-consuming, labor-intensive plowing.

DISCLOSURE OF INVENTION

Reducing the cost and difficulty of clearing debris at a logging site, a novel method suspends a rake from the main line of a yarder to clear debris. No longer need bulldozers grade the site to clear the debris, but rather the site can be cleared with a single rake hauled over the site. Not only are time and expense saved, but less damage is done to the site, because the rake is hauled above the surface when it clears debris. Instead of needing up to ten men, two or three men can set up a high-lead yarder rake is about three hours. Debris clearing can be reduced to one-quarter of the time required for plowing.

A durable, high-lead yarder rake is capable of clearing brush, timber, and other debris at a logging site when hauled just above the surface with the main line of a yarder. The backbone of this rake is a generally rectangular frame having a top, a bottom, two sides, a vertical, central cross-member extending between the top and bottom, and a horizontal tine support extending between the sides. A plurality of tines are mounted on the tine support to extend downwardly to rest against the frame's bottom and to project downwardly from the bottom to form teeth. Preferably, each tine is fabricated from a heavy-duty leaf spring. The tines are mounted to allow them to swivel upwardly from their resting position on the frame's bottom. Suitable means are used to connect the backbone of the rake to a main line to allow hauling of the rake along the main line just above the ground. To maintain the position of the rake relative to the main line when the rake is being hauled, a split tube means is fastened to the rake and to the main line apparatus. This split tube also allows easy removal of the rake from the main line when reversing the rake. The simple and economical design of this rake provides strength and durability for the rake and improved volume for the collection of debris. Increased volume for the rake is further enhanced by including a riser extension on top of the backbone of the rake.

BRIEF DESCRIPTION OF THE DRAWINGS

FIG. 2 is a detailed isometric of the rake of this invention.

FIG. 3 is a partially sectional side elevation of the rake of FIG. 2.

FIG. 4 is a partially sectional view taken along line 4—4 of FIG. 3.

BEST MODE FOR CARRYING OUT THE INVENTION

Figure 1:
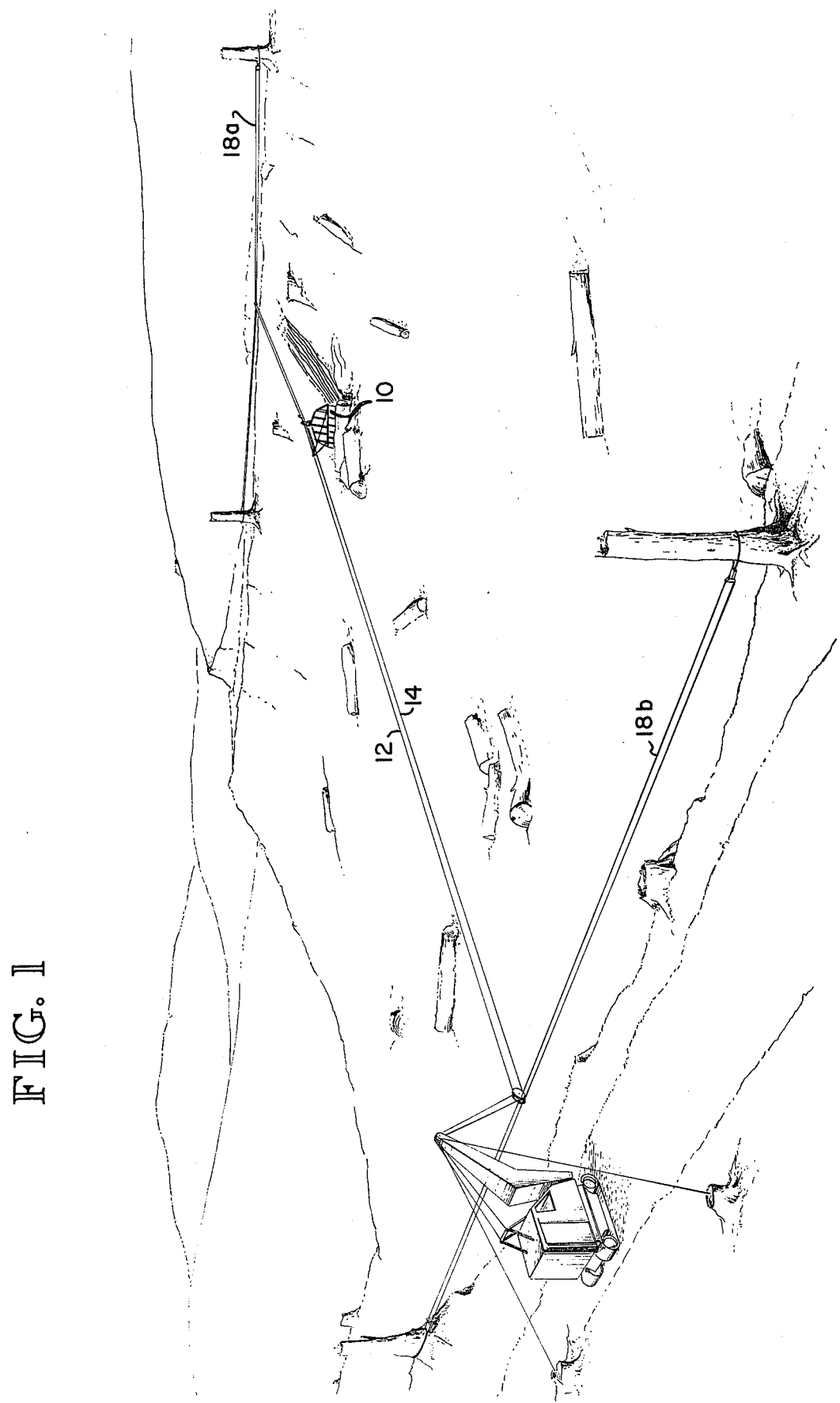
FIG. 1 is a schematic perspective of the high-lead yarder rake of this invention in its customary application.

The high-lead yarder rake 10 of this invention is hauled on a main line 12 by haul lines 14 connected to a yarder between two fixed lines 18a and 18b, either in a series of parallel sweeps or in a pie-shaped sectional sweep. Hauled just above the surface of the ground, the rake 10 clears the clear cut logging site of brush, timber, and other debris to ease further work at the site. The rake cn be moved up or down the main line with the yarder's winch or by a remote-controlled motorized carriage. Moved in 12 to 24-foot increments from side-to-side, the rake may easily be used to sweep out a rectangular area of between about 1200–2400 feet long by 600–800 feet wide.

Referring now to FIG. 2, the high-lead yarder rake 10 of this invention has a generally rectangular frame 20 having a top 21, a bottom 22, two sides 23, a vertical, central cross-member 24 extending between the top 21 and bottom 22, and a horizontal tine support 25 extending between the sides 23. Fabricated from $4'' \times 4'' \times \frac{1}{2}''$ rectangular steel tubing and welded together, the frame 20 of the rake of this invention provides an easily constructed, economical, and highly durable backbone for the rake. This frame 20 is able to withstand high stresses from racking forces. A plurality of tines 26 are mounted on the tine support 25 to allow swiveling motion upward from their resting points on the bottom 22. Thus, when the rake is hauled backwardly, the tines may swing away from the mount and are less susceptible to damage. The tines 26 preferably are spaced apart about 12–18 inches to allow easier passage of the rake 10 over stump-laden ground. Because the tines 26 are commonly fabricated from heavy-duty leaf springs, each tine is able to withstand relatively large jarring forces by flexing and dissipating the energy as would a common spring. Tines 26 of this construction require less frequent replacement due to bending or breakage. For example, when a stump is hit by the tines, the tines flex backwardly and upwardly. When the stump is cleared, the tines recoil to their original positions because of their elasticity.

To maintain the horizontal spacing between the tines 26, pairs of spaced ears 28 mounted on the bottom 22 of the frame 20 help to position the tines 26. If desired, the bottom 22 may be grooved to further accommodate the tines 26.

To further strengthen the frame 20, a plurality of spaced, vertical supports 29 may be placed between the top 21 and tine support 25. A riser extension 30 is preferably placed above the top 21 to increase the volume of debris that the rake 10 can hold. The riser extension 30 has a central, vertical support member 31 coextensive with the cross-member 24 of the basic frame 20, a plurality of spaced supports 32 extending from the top 21 to the arched sides 33. Gussets 34 ensure that the riser extension 30 is able to withstand relatively large racking forces.

Above the riser extension 30, a coupling 36 connects the rake 10 to the main line 12 through a revolving sheave 38. The coupling 36 also includes shackles 40 for connecting the haul lines to the rake 10 and a split tube 42 (having free-rolling sheaves 43 at its ends) to extend along the main line 12 to provide additional directional stability for the sheave 38 and easy removability and reversibility.

As best seen in FIG. 4, the rake 10 is connected to the coupling 36 through a pin 44 which allows the rake to be positioned at various angles from the vertical with respect to the main line 12. To maintain the position of the rake relative to the main line, a cable 46 is connected to the sides 23 of the frame 20 and passes through one eye 48 of a plurality of eyes mounted on the split tube 42. Alternatively to a plurality of spaced eyes, the split tube 42 may be telescopic to allow alteration of the angle of the rake 10 with respect to the vertical. The variable positioning of the angle of the rake 10 provides for optimal orientation of the rake even on steeply sloping ground. Therefore, the rake 10 may be used to clear the most efficient volume of debris in each pass.

To reverse the rake for clearing debris by hauling in the other direction, the main line 12 is slackened until the rake 10 rests on the ground. The pin 44 is pulled to free the rake from its connection to the coupling 36. The split tube 42 is unthreaded from the main line and is turned 180 degrees before being repositioned on the main line. The rake is then repinned to the coupling, and the main line is drawn taut.

I claim:

1. A high-lead yarder rake capable of clearing brush, timber, and other debris at a logging site when hauled just above the surface along a main line with a main line yarder, comprising:
   (a) a generally rectangular frame having a top, a bottom, two sides, a vertical, central cross-member extending between the top and bottom, and a horizontal tine support shaft extending between the sides;
   (b) a plurality of leaf spring tines, pivotally mounted on the tine support with generally circular eyes to allow the tines to swing upwardly from the bottom of the frame, each tine extending downwardly to rest against the frame's bottom and projecting downwardly from the bottom;
   (c) means to connect the rake to the main line to allow hauling of the rake along the main line;
   (d) means to maintain the position of the rake relative to the main line when the rake is hauled; and
   (e) means to maintain the spacing of the tines along the bottom of the frame.

2. The rake of claim 1 wherein the means to maintain the spacing are pairs of spaced ears on the bottom between which the tines rest.

3. The rake of claim 1 wherein the frame further has a plurality of spaced, vertical supports between the top and the tine support to provide additional resistance to racking forces.

4. The rake of claim 1, further comprising means above the top to increase the volume of debris that the rake can hold.

5. The rake of claim 1 wherein the means to connect the rake to the main line comprises a support sheave capable of rolling along the main line, means connecting the sheave to the frame, and means to connect haul lines to the rake to allow hauling along the main line.

6. The rake of claim 5 wherein the means to connect the rake to the main line further comprises a split tube extending along the main line to provide additional directional stability for the sheave and rake.

7. The rake of claim 6 wherein the means to maintain the position of the rake comprises a cable attached to sides of the frame and passing through an eye on the split tube.

8. The rake of claim 1 wherein the means to connect the rake to the main line includes means for allowing the rake to assume various angles with respect to the vertical, and wherein the rake further comprises means for maintaining the angle of the rake with respect to the vertical at a predetermined angle.

9. The rake of claim 1 wherein the means to connect the rake to the main line includes a hinge to allow adjustment of the angle of the rake with respect to the vertical.

10. A high-lead yarder rake capable of clearing brush, timber, and other debris at a logging site when hauled just above the surface along a main line with a main line yarder, comprising:
    (a) a generally rectangular frame having a top, a bottom, two sides, a vertical, central cross-member extending between the top and bottom, a horizontal tine support shaft extending between the sides, and a plurality of spaced, vertical supports extending between the top and the tine support shaft;
    (b) a plurality of leaf spring tines, pivotally mounted on the tine support shaft with generally circular eyes, each tine extending downwardly to rest against the bottom of the frame and projecting downwardly from the bottom;
    (c) means on the bottom of the frame to maintain the spacing of the tines along the frame;
    (d) means to connect the rake to the main line to allow hauling of the rake along the main line; and
    (e) means to maintain the position of the rake relative to the main line when the rake is hauled.

11. The rake of claim 10, further comprising means on the top of the frame to increase the volume of debris that the rake can hold.

12. The rake of claim 10 wherein the means to connect the rake to the main line includes means to allow the rake to assume various angles with respect to the vertical and wherein the rake further comprises means to allow variable positioning of the rake with respect to the vertical.

13. A rake useful with a high-lead yarder or the like, comprising:
    (a) a generally rectangular frame having a top, a bottom, two sides, a vertical, central cross-member extending between the top and bottom, a horizontal tine support shaft extending between the sides, and a plurality of spaced, vertical supports extending between the top and the tine support shaft;
    (b) a plurality of leaf spring tines, pivotally mounted on the tine support shaft with generally circular eyes, each tine extending downwardly to rest against the bottom of the frame, projecting downwardly from the bottom, and capable of swinging upwardly from contact with the bottom in one rotational sense about the tine support shaft; and
    (c) means on the bottom of the frame to maintain alignment of the tines with respect to the frame.

14. The rake of claim 13 wherein the means to maintain alignment includes a plurality of pairs of spaced ears projecting from the bottom between which the tines rest.

15. The rake of claim 13 wherein the rake further comprises a riser extension above the top to increase the volume of debris that the rake can hold.

16. A high-lead yarder rake capable of clearing brush, timber, and other debris at a logging site when hauled just above the surface along a main line with a main line yarder, comprising:
- (a) a generally rectangular frame having a top, a bottom, two sides, a vertical, central cross-member extending between the top and bottom, a horizontal tine support extending between the sides;
- (b) a plurality of tines mounted on the tine support, extending downwardly to rest against the frame's bottom, and projecting downwardly from the bottom;
- (c) means to conduct the rake to the main line to allow hauling of the rake along the main line, including a support sheave capable of rolling along the main line, means connecting the sheave to the frame, means to connect haul lines to the rake to allow hauling along the main line, and a split tube extending along the main line to provide additional directional stability for the sheave and rake, wherein the split tube has a plurality of eyes to allow the angle of the rake to be varied and wherein the means connecting the sheave to the frame is capable of accommodating the positions; and
- (d) means to maintain the position of the rake relative to the main line when the rake is hauled, wherein the means to maintain the position of the rake comprises a cable which is attached to sides of the frame and which passes through one of the eyes on the split tube.

17. A high-lead yarder rake capable of clearing brush, timber, and other debris at a logging site when hauled just above the surface along a main line with a main line yarder, comprising:
- (a) a generally rectangular frame having a top, a bottom, two sides, a vertical, central cross-member extending between the top and bottom, a horizontal tine support extending between the sides, and a plurality of spaced, vertical supports extending between the top and the tine support;
- (b) a plurality of tines mounted on the tine support, extending downwardly to rest against the bottom of the frame, and projecting downwardly from the bottom;
- (c) means on the bottom of the frame to maintain the positions of the tines with respect to the frame; and
- (d) means to connect the rake to the main line to allow hauling of the rake along the main line, including:
  - (i) a support sheave capable of rolling along the main line;
  - (ii) means connecting the sheave to the frame;
  - (iii) a split tube extending along the main line to provide additional directional stability for the sheave and rake;
  - (iv) at least one eye on the tube;
  - (v) a cable connected to sides of the rake and passing through the eye to maintain the position of the rake relative to the main line when the rake is hauled; and
  - (vi) means to allow the rake to assume various angles with respect to the vertical; and
- (e) means to allow variable positioning of the rake with respect to the vertical.

18. A high-lead yarder rake capable of clearing brush, timber, and other debris at a logging site when hauled just above the surface along a main line with a main line yarder, comprising:
- (a) a generally rectangular frame having a top, a bottom, two sides, a vertical, central cross-member extending between the top and bottom, a horizontal tine support extending between the sides, a connector to connect the frame to the main line to allow hauling of the rake along the main line in a relatively fixed position of the rake relative to the main line when the rake is hauled; and
- (b) a plurality of tines pivotally mounted to the tine support to allow the tines to swing upwardly from the bottom of the frame without restriction in a first rotational sense, each tine extending downwardly to rest against the frame's bottom and downwardly beyond the bottom, the bottom stopping rotation of the tines in the other rotational sense.

* * * * *